Figure 1:
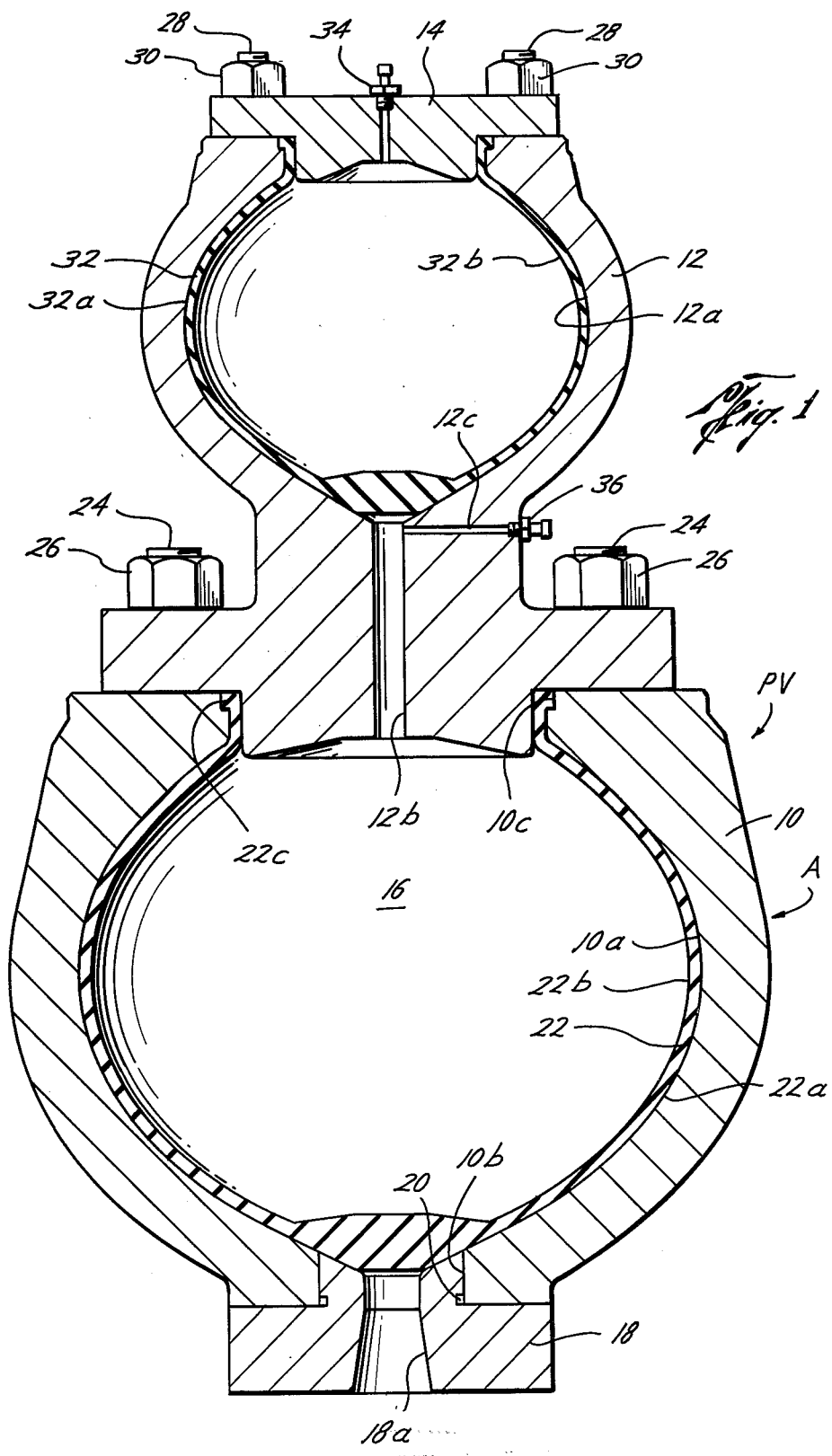

United States Patent [19]

Lewis

[11] 4,195,668
[45] Apr. 1, 1980

[54] HIGH CAPACITY PULSATION DAMPENER OR SURGE ABSORBER

[75] Inventor: George E. Lewis, Arcadia, Calif.
[73] Assignee: Hydril Company, Los Angeles, Calif.
[21] Appl. No.: 2,111
[22] Filed: Jan. 18, 1979
[51] Int. Cl.² .............................................. F16L 55/04
[52] U.S. Cl. ........................................ 138/30; 138/26; 137/207; 220/85 B
[58] Field of Search ................ 138/26, 27, 28, 30, 138/31; 220/85B; 137/207, 208

[56] References Cited

U.S. PATENT DOCUMENTS

| 942,666 | 12/1909 | Romstaedt | 138/26 |
|---|---|---|---|
| 2,258,469 | 10/1941 | Podolsky | 138/26 X |
| 2,320,886 | 6/1943 | Quiroz | 138/30 X |
| 2,638,932 | 5/1953 | Alexander | 138/30 |
| 2,773,455 | 12/1956 | Mercier | 138/30 X |
| 2,904,077 | 9/1959 | Trumper | 220/85 B |
| 3,230,976 | 1/1966 | Mercier | 138/30 |
| 4,000,758 | 1/1977 | Meisenheimer | 138/31 |

Primary Examiner—Richard E. Aegerter
Assistant Examiner—James E. Bryant, III
Attorney, Agent, or Firm—Pravel, Gambrell, Hewitt, Kirk, Kimball & Dodge

[57] ABSTRACT

A pulsation dampener for dampening undesired pressure surges in a fluid comprising a pressure vessel having a first zone for receiving a fluid under pressure, a second zone having a compressible fluid therein at a preselected pressure and a third zone in communication with the second zone having a compressible fluid therein at a preselected fluid pressure greater than the preselected fluid pressure of the second zone. The pulsation damper can be designed as a supplemental pressure vessel to be added to conventional dampeners. The pulsation dampener can include a magnet assembly valve.

17 Claims, 2 Drawing Figures

HIGH CAPACITY PULSATION DAMPENER OR SURGE ABSORBER

TECHNICAL FIELD

This invention relates generally to devices for reducing the pressure pulsations and pressure surges in confined fluids.

Such pressure pulsations may result in the discharge of a positive displacement pump while pressure surges may result in the closing of a fast-acting valve in a flowing stream of fluid. By eliminating the cyclic pulsation in a fluid the associated meters, valves, fittings and the pumps themselves have their service life increased as well as greatly improving the accuracy of meter readings of fluid conditions. Surge absorbers control any sudden pressure surges that may be caused by a pump start up or shutdown and also reduces to a negligible value any surges in pipelines that may result from power failure or other causes. The surge absorbers are also indispensible to truck and tank car loading operations and for protecting airport fuel and hydrant systems.

Such pulsation dampeners or surge absorbers have usually comprised a pressure vessel or accumulator having a flexible diaphragm or bladder disposed within a cavity of the pressure vessel. A compressible fluid is precharged on one side of the diaphragm while the other side of the diaphragm is exposed to the fluid having the pressure pulsation or surges to be dampened.

While there is clear difference in application of the pulsation dampener and the surge absorber, the same apparatus, in fact, will serve both applications and a reference to one application herein will be understood to include the other application unless expressly excluded herein.

BACKGROUND ART

This invention relates to an improved pulsation dampener or surge absorber.

The art of dampening the pressure surges or pulsations in a stream of incompressible fluid has risen to a high level of skill. Examples of the technology of this art are reflected in the following patents that are assigned to the assignee of the present invention:

| U.S. Pat. No. | PATENTEE | ISSUE DATE |
| --- | --- | --- |
| 2,757,689 | Knox | Aug. 7, 1956 |
| 2,804,884 | Knox | Sept. 3, 1957 |
| 3,169,551 | Lewis | Feb. 16, 1965 |
| 3,674,053 | Murman | July 4, 1972 |
| 3,880,193 | Lewis | Apr. 29, 1975 |

While the embodiment disclosed in Knox U.S. Pat. No. 2,757,689 has been extremely successful, it did possess certain limitations. In order to be effective for the full range of pulsating fluid conditions, the pulsation dampener is precharged with a compressible fluid, usually nitrogen, to a preselected optimum pressure. If the preselected pressure exceeds the pulsating fluid pressure no dampening will occur. While the preselected optimum pressure may be changed as operating conditions of the pulsating fluid changes, such changes in the preselected pressure were time consuming to make. To assure the proper volume of the compressible fluid at the preselected optimum pressure in the pulsation dampener, it was desirable to reduce the pulsating fluid pressure to zero. As pulsating fluid operating pressure increased, it was necessary to increase the preselected optimum pressure and which increased the period of time to pressure the pulsating fluid sufficiently for pulsation dampening to occur. This is very undesirable and particularly so in the case of positive displacement drilling mud pumps used during rotary drilling operations. During such drilling operations pressure surges or pulses from another source are often used as signals and the presence of undesired pulsations may be incorrectly interpreted as a signal.

To achieve a large range of operating conditions, a relatively large volume of compressible fluid was required. At higher operating pressure of the pulsating fluid, the weight of the pulsation dampener increased significantly for a given volume of compressible fluid. Not only did this make the initial cost of the pulsation dampener greater, but also the cost of transporting the pulsation dampener. This latter cost could be very significant in rotary drilling operations where the pulsation dampener is transported between drilling sites. U.S. Pat. Nos. 2,804,884 and 3,169,551 are similar in construction to the previously discussed Knox patent and generally have the same characteristics.

In Murman U.S. Pat. No. 3,674,053, the diaphragm is inverted for protecting the metal pressure vessel shell from the fluid being pressure dampened. The inlet nozzle is formed with the threads for connecting with a conduit containing the pulsating fluid. In addition, no means are provided to control wrinkling of the diaphragm when the reference fluid pressure greatly exceeds the fluid pressure of the fluid being pressure dampened.

Bladders or diaphragms are known which fold back or overlap themselves on one side under certain pressure conditions. One such example is disclosed in Peters U.S. Pat. No. 3,162,213. To control folding of the bladder or diaphragm, external stiffeners, such as disclosed in Overbeke U.S. Pat. No. 2,380,866, have been used.

In U.S. Pat. Nos. 2,378,467 and 2,397,248, both to DeKiss, there is disclosed accumulator bladders that overlap and which have integral molded annular ribs or beads which control the radius of curvature of the bladder at the fold. Such a rib is required because at low temperatures the diaphragm may become brittle and crack when folded flat upon itself without a radius of curvature being provided. In both DeKiss disclosures, the bladder is not arranged for isolating the pulsating fluid from the pressure vessel. The DeKiss patents also make a distinction between a bladder and a diaphragm type accumulator. In the present disclosure, however, it is to be understood that diaphragm and bladder are to be considered to be used interchangeably as the flexible separation element, unless expressly stated otherwise.

The Lippincott U.S. Pat., No. 2,397,796 also discloses a diaphragm having a rib to control the reverse bending to prevent cracking, but like the DeKiss patents, the fluid to be dampened is exposed to the pressure vessel.

In U.S. Pat No. 2,773,455, issued Dec. 11, 1956 to Mercier, an accumulator system using a pair of connected pulsation dampeners is disclosed. The pulsation dampeners are arranged to provide a differential pressure, or hydrostatic head therebetween of the pulsating fluid. The resulting greater dampening pressure in the lower accumulator is communicated to the upper accumulator for insuring that dampening fluid pressure in the upper accumulator exceeds the pulsating fluid pressure. While such arrangement was useful, both diaphragms were exposed to the full operating pressure at all operating pressure levels which would reduce diaphragm life. Furthermore, the volume of pulse absorbing gases uniformly decreased at high operating pressure which reduced the overall system efficiency to that of a single accumulator.

SUMMARY OF THE INVENTION

An improved pulsation dampener or surge absorber providing dampening at relatively low operating pressure which maintains high volumetric dampening efficiency at the higher operating pressures without having to increase pressure of the dampening fluid. A third dampening zone having compressible dampening fluid therein is operably connected with the normal compressible fluid dampening zone of the pulsation dampener. The third dampening zone is charged to a higher pressure than the normal dampening zone. Only when the operating fluid pressure exceeds the charged fluid pressure in the third zone does the third zone participate in the pulsation dampening. The additional volume of the third zone at the high pressure improves the dampening efficiency and capacity of the pulsation dampener.

Two embodiments are disclosed. The first embodiment separates the compressible fluid zones while the second embodiment utilizes a valve means for communicating the third dampening zone with the normal dampening zone at the higher operating pressures.

The use of the third dampening zone enables a much smaller pulsation dampener to be provided in comparison with a pulsation dampener having only a normal dampening zone. This provides a savings both in initial cost as less material is needed to form the capacity of the pulsation dampener and increases the portability of the pulsation dampener.

BRIEF DESCRIPTION OF THE VIEWS

Figure 2:
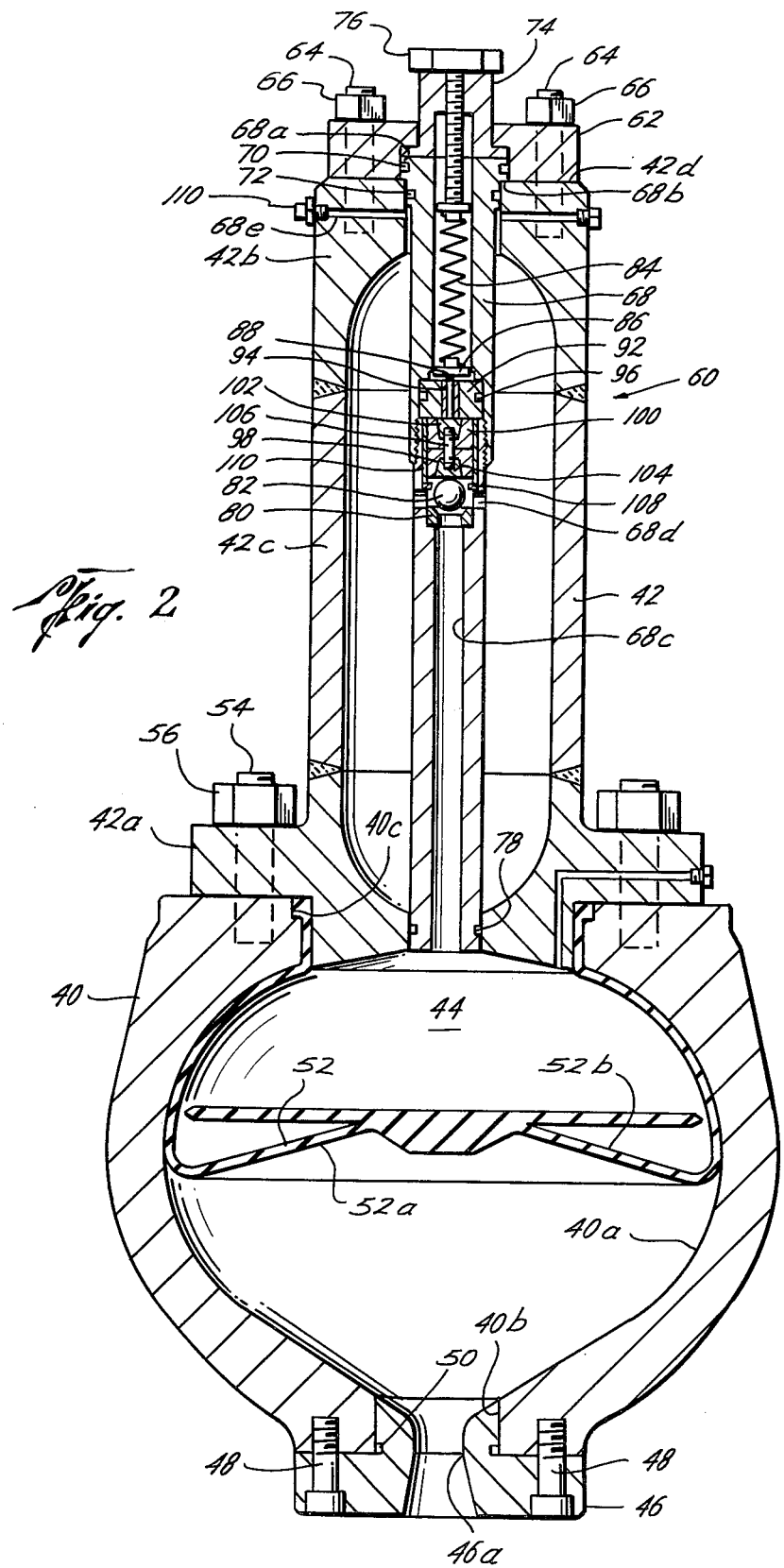

FIG. 1 is a side view in section of a pulsation dampener or surge absorber of the present invention; and FIG. 2 is a view similar to FIG. 1 of the second embodiment of the present invention.

BEST MODE OF OPERATION

The first embodiment of the pulsation dampener or surge absorber apparatus, generally designated A, is illustrated in FIG. 1. The apparatus A includes a pressure vessel generally designated PV formed by the primary pressure vessel 10 and the supplemental pressure vessel 12 having the top closing flange 14. Both the primary pressure vessel 10 and secondary pressure vessel 12 are substantially spherical in shape and are generally of steel construction such as those identified in the patents previously identified as being assigned to the assignee of the present invention and which are hereby fully incorporated by this reference. Both the primary pressure vessel 10 and the secondary pressure vessel 12 are formed by suitable means such as welding and which construction is well known to those skilled in the art.

The pressure vessel 10 is provided with an inner surface 10a which cooperates with the inner surface 12a and the top flange 14 for forming a cavity or opening in the pressure vessel cavity, generally designated 16 formed in the pressure vessel PV. The lower portion of the pressure vessel 10 is provided with an opening 10b in which is secured by suitable means, such as bolting (not illustrated) a tubular inlet nozzle 18 for forming a first opening 18a to provide an inlet nozzle for the ingress and egress of the fluid to be dampened within the cavity 16. An O-ring 20 carried by the inlet nozzle 18 seals the inlet nozzle to the primary pressure vessel 10.

Disposed within the cavity 16 adjacent the surface 10a is a first flexible diaphragm 22 for dividing the cavity 16 into a first zone below the diaphragm 22 and a second zone above the diaphragm 22. Fluid pressure in the first zone urges on the surface 22a of the diaphragm for urging a collapse of the diaphragm 22 while fluid pressure in the second zone urges on the surface 22b of the diaphragm for urging the diaphragm outwardly to the position illustrated where it is supported by the inner surface 10a of the pressure vessel 10. A suitable bridging insert or element (not illustrated) bridges over the inlet opening 18a to prevent an undesired pressure differential from extruding or flowing the diaphragm 22 when the pressure in the second zone exceeds the pressure in the first zone. The first zone communicates through the inlet opening 18a for urging on the diaphragm surface 22a with the pressure of the fluid having the pulsations to be dampened. The diaphragm 22 is provided with the annular collar 22c which is captured in an annular recess 10c of the pressure vessel 10 for securing in the usual manner.

The pressure vessel 10 is secured to the supplemental pressure vessel 12 by a suitable means such as a plurality of equally circumferentially spaced bolts 24 having nuts 26 threadedly received thereon for holding the diaphragm collar 22c in sealing engagement with both the lower primary pressure vessel and the upper secondary pressure vessel 12. The flange 14 is secured to the upper or supplemental vessel by bolts 28 and nuts 30 in a similar manner.

Disposed within the portion of the cavity 16 formed by the supplemental pressure vessel 12 is a second flexible diaphragm 32 for separating the second zone formed by the first diaphragm 22 from a third zone enclosed by the diaphragm 32. The diaphragm 32 is provided with a suitable bridging element (not illustrated) for covering a flow passage 12b which communicates the inner surface 12a of the supplemental pressure vessel 12 below diaphragm 32 with the second zone within the pressure vessel 10. The diaphragm 32 is provided with an outer or lower surface 32a in which the fluid pressure in the second zone urges thereon for collapsing the diaphragm 32. An inner surface 32b of the diaphragm 32 is urged on by a reference pressure introduced through charging valve 34 for urging the diaphragm 32 to expand outwardly to the position illustrated where it is supported by the inner wall 12a of the supplemental pressure vessel. While the communicating passage or opening 12b is illustrated as a single opening, it is to be understood that a plurality of very small flow openings can be used advantageously. A charging valve 36 communicates with the communicating passage 12b through a fill connection 12c for enabling charging of the second zone with a desired fluid pressure.

The above arrangement has been found to be of superior capacity in dampening fluid pressures over a wide spread range of operating pressure. Until the pressure of the operating fluid having the pulsation to be dampened exceeds the reference or charge pressure in a pulsation dampener, no dampening can occur. Thus it is desirable to have this pressure as low as possible. However, if this is done, the volume of the compressible fluid is usually so small at higher pressures that the volumetric efficiency becomes quite low. The larger the gas volume in the apparatus A the smaller will be the change in pressure with a given volume of fluid injected into the dampener by increased pressure of the operating fluid.

In order to increase efficiency at high pressure and maintain a low starting precharge pressure the above system has been provided. The primary dampener 10 is provided with a twenty gallon, or 75.7 liter, internal capacity with the secondary pressure vessel 12 being provided with a five gallon, or 18.9 liter, internal capacity. If a twenty gallon or 75.70 liter unit is precharged to 765 psia or 52.04 atmospheres with compressible fluid such as nitrogen gas, the volume would be compressed to 3.05 gallons or 11.54 liters at 5015 psia or 341.15 atmospheres pressure of the pulsating operating fluid. The change in pressure per gallon of operating fluid injected at 5015 psia or 341.15 atmospheres would be 1558 psia or 105.98 atmospheres. By precharging the five gallon or 18.92 liter secondary pressure vessel 12 to 2958 psia or 201.22 atmospheres an additional five gallons or 18.92 liters of gas volume would be added when that pressure is reached and the total gas volume available for dampening in both the primary pressure vessel 10 and the secondary pressure vessel 12 at an operating fluid pressure of 5015 psia or 341.15 atmospheres will be six gallons or 22.71 liters. The change in pressure of the compressible fluid per gallon injected would be lowered from 1558 psia or 105.99 atmospheres to 716 psia or 48.71 atmospheres. Such calculations are based upon isothermal compression and expansion. However, it is understood that when the gas is first compressed the conditions will be adiabatic and the compressed volume will be larger than that given above.

If the second zone is precharged to 765 psia or 52.04 atmospheres and the third zone to 2015 psia or 137.07 atmospheres slightly better dampening would occur at pressure of the operating fluid from 2015 psia or 137.07 atmospheres to 2958 psia or 201.22 atmospheres. However, beyond the 2958 psia or 201.22 atmospheres operating pressure a 2958 psia or 201.22 atmospheres precharge in the third zone would be preferred. Furthermore, at 5015 psia or 341.15 atmospheres the second zone would become inoperative as the lower diaphragm 22 would no longer displace any gas volume.

That condition could be avoided by increasing the precharge in the second zone, for example, to 1000 psia or 68.03 atmospheres and the precharge on the third zone to 2015 psia or 137.07 atmoshperes. Under those precharge pressure conditions, the final total gas volume will be six gallons or 22.71 liters at the 5015 psia or 341.15 atmospheres operating pressure. This would insure gas displacement in the second zone. However, the primary precharge 1000 psia or 68.03 atmospheres is higher than desirable for good diaphragm life of the diaphragm 22. To achieve the foregoing dampening over the 5000 pressure range with a single pressure vessel and diaphragm, it is necessary to use a forty gallon or 151.40 liter capacity pressure vessel. Such pressure vessel is both bulkier and heavier and submits the single diaphragm thereof to the full pressure differential range. Another advantage of the present tandem design is that an existing 20 gallon or 75.7 liter capacity pressure vessel 10 can be modified by replacing the flange thereof with the secondary pressure vessel 12 for increasing the capacity without the need to discard the existing pressure vessel 10.

In a second embodiment of the present invention A, illustrated in FIG. 2 and described in detail hereinafter, a pressure separator is provided by an adjustable spring loaded valve that is set to close when the dampening fluid pressure in the second zone is below a predetermined value and thereby isolating the high pressure in the third zone while the balance of the dampening gas in the second zone urging upon the diaphragm is allowed to expand to a much lower precharge value. This valve can be adjusted from time to time to close at a value suitable for the operating conditions. The valve thus serves to communicate the second and third zone at the upper pressure operating ranges and blocks communication therebetween for allowing the dampening pressure to be reduced in the second zone.

In a manner similar to the first embodiment, apparatus A includes a pressure vessel PV formed by the primary pressure vessel 40 and a supplemental upper elongated pressure vessel 42. The substantially spherical primary pressure vessel 40 is similar to the primary pressure vessel 10. The elongated metal supplemental pressure vessel 42 is preferably formed of a lower flange connection 42a and an upper connection 42b that are connected by intermediate tubular portion 42c by welding in the known manner.

Pressure vessel 40 is provided with an inner substantially spherical surface 40a for forming an opening or cavity 44 within the pressure vessel PV. The lower portion of the primary pressure vessel 40 is provided with an opening 40b in which is secured a tubular inlet nozzle 46 for forming a first opening 46a to provide an inlet nozzle for the ingress and egress of the fluid to be dampened within the pressure vessel cavity 44. Preferably, a plurality of equi-circumferentially spaced bolts 48 are employed to secure the inlet nozzle 46 to the pressure vessel 40. The inlet nozzle 46 is secured to the conduit containing the pulsating fluid in any desired manner while an O-ring 50 blocks leakage of fluid between the inlet nozzle 46 and the primary pressure vessel 40 in the usual manner.

Disposed within the cavity 44 adjacent the surface 40a is a flexible diaphragm 52 for dividing the cavity 44 into a first zone below the diaphragm 52 and a second zone above the diaphragm 52. Fluid pressure in the first zone urges on the outer surface 52a of the diaphragm 52 for urging a collapse of the diaphragm 52 while fluid pressure in the second zone urges on the inner surface 52b of the diaphragm 52 for urging the diaphragm outwardly to a position where it would be supported by the inner surface 40a of the pressure vessel 40. A suitable bridging insert or element (not illustrated) will bridge over the inlet opening 46a to prevent an undesired pressure differential from extruding or flowing the diaphragm 52 when the pressure in the second zone exceeds the pressure in the first zone. The first zone communicates through the inlet opening 46a for urging on the diaphragm surface 52a with the pressure of the fluid having pulsations to be dampened. The diaphragm is provided with an annular collar 52c which is captured in an annular recess 40c of the primary pressure vessel 40 for securing and sealing in the usual manner.

The primary pressure vessel 40 is secured to the supplemental pressure vessel 42 by suitable means such as a plurality of equi-circumferentially spaced bolts 54 having nuts 56 threadedly received thereon for holding the diaphragm collar 52c in sealing engagement with both the lower primary pressure vessel 40 and the upper secondary pressure vessel 42. Disposed within the portion of the cavity 44 formed by the supplemental pressure vessel 12 is the pressure separator valve apparatus generally indicated as 60. The valve 60 is secured in the chamber 44 by the pressure vessel cap 62 which is secured to the supplemental pressure vessel 42 by a plurality of equi-circumferentially spaced threaded bolts 64 having nuts 66 thereon for securing in the usual manner.

The separator valve 60 is formed by elongated tubular housing 68 having outwardly extending collar 68a disposed above the upwardly facing annular shoulder surface 42d of the supplemental pressure vessel 42. A downwardly facing annular shoulder 68b formed by collar 68a engages the shoulder 42d for preventing further movement of the valve housing 68 within the cavity 44. An O-ring 72 seals the tubular valve housing 68 with the supplemental pressure vessel 42 in the usual manner. Blind holes 70 are provided for a tool (not shown), used to extract the valve assembly 60 for servicing. Disposed above the valve housing 68 is a hand wheel adjustment support or holding member 74 for threadedly receiving therein the movable hand wheel adjustment knob 76. The hand wheel support member 74 is secured against upward movement by the cap 62 and which cooperates for holding the valve housing 68 against movement within the cavity 44.

The valve housing 68 extends downwardly from the annular collar 68a for sealing with the supplemental pressure vessel 42 with O-rings 78 adjacent lower flange connection 42a. Fluid pressure in the second zone urging on the surface 52b of the diaphragm 52 will thereby be communicated up the central bore 68c where it will communicate outwardly through port 68d into the third zone which is formed by the supplemental pressure vessel 42 exteriorly of the valve housing 68. An upwardly facing annular seat 80 which surrounds the inlet 68c of the valve housing 68 cooperates with a movable ball 82 for controlling communications between the third zone and the second zone in a manner to be described more fully hereinafter. When the pressure in the third zone exceeds the pressure in the second zone the ball 82 will be held on the seat 80 for preventing equalization of the pressures in the second and third zone. When the pressure in the second zone equals pressure in the third zone the seat 80 and ball 82 will be spaced for placing the second and third zone in communication and providing the volume of the third zone for assisting in dampening the fluid pressure in the first zone. Preferably, the seat 80 is formed of relatively soft resilient material to insure a gas tight seal.

Means for controlling movement of the ball 82 to and from sealing engagement with the annular seat 80 includes a spring 84 that is controllably tensioned by rotating the hand wheel 76 threadedly secured to the mounting member 74. The spring 84 provides the set force for pressure in the second zone to overcome to move the ball 82 from the seat 80 and thereby communicate the second and third zones. The force from the spring is transmitted to the ball 82 through a spring plate 86, a push rod 88 and a magnetic snap action assembly 90. The push rod 88 is molded and bonded into a pressure plate with a rubber annulus 94. This arrangement allows longitudinal friction free movement of the push rod 88 in the pressure plate 92 as well as producing a gas tight pressure seal around the push rod 88. The seal plate 92 is sealed to the tubular housing member 68 by an O-ring 96 in the usual manner for containing the fluid pressure in the third zone.

The magnetic assembly 90 provides a fast full opening and closing of the ball 82 on the seat 80. The magnetic assembly consists of a first magnet 98 arranged to provide a magnetic force that adds to the spring force keeping the ball 82 in the closed position. A second magnet 100 provides force opposed to the spring force for tending to keep the valve open. When the magnetic holding forces of the magnets 98 and 100 are properly chosen, the pressure required to open the valves will be greater than the pressure to close the valve and the valve will operate with a snap action. The two magnets 98 and 100 are held together by two conical nuts 102 and 104 and secured on bolt 106. The bolt 106 and the nuts 102 and 104 are made of non-magnetic material in order that open retaining force is provided by the magnetic linkage between the magnet 100 and the seal plate 92. The closing retaining force is provided by the magnetic linkage between the magnet 98 and the ring 108 which retains the ball 82 above the seat 80. A non-magnetic guide sleeve 110 serves as movement guide for the magnetic assembly 90. When the valve is open, passage of the dampening fluid from the second zone to the third zone is through the flow ports 68d adjacent the ball 82.

The following procedure is used to precharge the tandem pulsation dampener of the second embodiment. First, the pressure control is released by turning the hand wheel 76 to release the urging of the spring 84. A pressure source such as a bottle of compressed nitrogen (not illustrated) is then connected to the charging valve 110 which communicates with the cavity 44 through a charging passage 68e in the usual manner. As the pressure of the nitrogen within the supplemental pressure vessel 42 increases it will urge upwardly upon the pressure plate 92 for urging it upwardly along with the magnetic assembly 90 which will carry the ball 82 upwardly from the seat 80. This will enable the charging pressure to flow from the third zone into the second zone where it will urge upon the surface 52b of the diaphragm 52. At a desired precharged level, for example, 1204 psia or 81.9 atmospheres, the pressure charge is terminated. The pressure adjustment hand wheel 76 is then turned to effect closure of the ball 82 upon the seat 80 and the opening pressure is set by further adjustment of the handle 76, for example, a pressure setting of 3015 psia or 205.1 atmospheres. Hydraulic pressure is then applied to the first zone to a level slightly greater than 3015 psia, for example, 3515 psia or 239.1 atmospheres, which will cause the valve 80 to open and the nitrogen pressure in the second and third chambers to equalize. When the hydraulic fluid pressure in the first zone is then reduced the valve will close at the 3015 psia or 205.1 atmospheres setting trapping that pressure in the upper or third zone while complete reduction of the hydraulic pressure in the first zone will expand the gas remaining in the secondary zone to 750 psia or 51 atmospheres. The pulsation dampener of FIG. 2 will then function in the same manner and with the same advantages as described with respect to the first embodiment.

The foregoing disclosure and description of the invention are illustrative and explanatory thereof, and various changes in the size, shape and materials as well as in the details of the illustrated construction may be made without departing from the spirit of the invention.

I claim:

1. A pulsation dampener for dampening undesired pressure surges in a fluid, including:
    a pressure vessel formed a cavity means for receiving and containing fluid under pressure in said cavity means, said pressure vessel having a first opening providing a flow passage for permitting ingress and egress of fluid subject to the undesired pressure surges from said cavity means through said flow passage;

a flexible diaphragm disposed in said cavity for dividing said cavity means into a first zone for receiving a first fluid and a second zone for receiving a second fluid, said first zone communicating with said flow passage;

means operably mounted with said pressure vessel for providing a preselected fluid pressure charge of compressible fluid into said second zone for dampening the pressure surges in said first zone; and a third zone formed in said cavity, said third zone having a compressible fluid of a preselected fluid pressure greater than the preselected fluid pressure in the second zone, said third zone operably connected with said second zone for dampening the fluid subject to the undesired pressure surges in the first zone as the fluid subject to the undesired pressure surges increases in pressure to the greater preselected fluid pressure in the third zone wherein additional dampening volume of compressible fluid is provided by the third zone at the greater preselected fluid pressure.

2. The pulsation dampener as recited in claim 1, wherein:
a second flexible diaphragm disposed in said cavity for separating said second zone and said third zone.

3. The pulsation dampener as recited in claim 2, wherein:
said second flexible diaphragm is supported by said pressure vessel until the fluid pressure in said second zone exceeds the greater preselected fluid pressure in said third zone.

4. The pulsation dampener as recited in claim 1, including:
valve means for operably connecting said second zone and said third zone, said valve means closing communication between said second zone and said third zone when the fluid pressure in said second zone is below a predetermined set valve, said valve means enabling fluid communication between said second zone and said third zone when the fluid pressure in said second zone exceeds the predetermined set valve.

5. The pulsation dampener is recited in claim 4, wherein:
said valve means having a movable closure means for closing communication between said second zone and said third zone in a first position and for enabling communication between said second zone and said third zone in a second position; and
means for urging said movable closure means to the first position.

6. The pulsation dampener as recited in claim 5, wherein:
said means for urging said movable closure to the first position is adjustable.

7. The pulsation dampener as recited in claim 5, including:
said valve means for moving said closure means between the first and second positions having a magnet assembly providing a snap action to said valve means for moving said valve means to the second position at a compressible fluid pressure greater than that required to move said valve means to the first position.

8. The pulsation dampener as recited in claim 7, wherein:
said means for moving are arranged so that the fluid pressure in the second zone required to move said movable closure means to the second position is greater than the pressure in the second zone for enabling movement of said movable closure means to the first position by said means for urging.

9. The pulsation dampener as recited in claim 5, wherein:
said movable closure means includes a ball; and
said valve means having an annular seat for sealingly engaging with said ball when in the first position for closing communication and movable from sealing engagement when in the first position for enabling communication between the second zone and said third zone.

10. An improvement for pulsation dampener having a flanged head and a diaphragm disposed within the cavity of the pulsation dampener for separating the fluid having the undesired pulsations in a first zone and the compressible fluid for dampening the pulsations in a second zone, the improvement comprising:
a supplemental pressure vessel for securing to the pulsation dampener in place of the flanged head, said supplemental pressure vessel also having a cavity for forming a third zone, a compressible fluid at a preselected pressure in said cavity of said supplemental pressure vessel, said supplemental pressure vessel cavity communicating with the second zone, the second zone having a compressible fluid at a preselected pressure therein, the compressible fluid of the third zone having a preselected fluid pressure greater than the preselected fluid pressure of the second zone; and
means for operably connecting said third zone with the second zone for dampening the fluid subject to the undesired pressure surges with the compressible fluid in the third zone when the pressure in the second zone reaches the preselected pressure of said third zone.

11. The improvement recited in claim 10, wherein:
said supplemental pressure vessel cavity having a second flexible diaphragm disposed therein for separating the second zone and said third zone.

12. The improvement recited in claim 11, wherein:
said second flexible diaphragm is supported by said supplemental pressure vessel until the fluid pressure in the second zone exceeds the preselected pressure in said third zone.

13. The improvement recited in claim 10, including:
valve means mounted with said supplemental pressure vessel for operably connecting the second zone with said third zone, said valve means closing communication between the second zone and said third zone when the fluid pressure in the second zone is below the preselected pressure of said third zone, said valve means enabling fluid communication between the second zone and said third zone when the fluid pressure in said second zone exceeds the preselected pressure of said third zone.

14. The improvement recited in claim 13, wherein:
said valve means having a movable closure means for closing communication between the second zone and said third zone in a first position and for enabling communication between the second zone and said third zone in a second position; and
means for urging said movable closure means to the first position.

15. The improvement recited in claim 14, including:

said valve means for moving said closure means between the first and second positions having a magnet assembly providing a snap action to said valve means for moving said valve means to the second position at a compressible fluid pressure greater than that required to move said valve means to the first position.

16. The pulsation dampener as recited in claim 15, wherein:
said means for moving are arranged so that the fluid pressure in the second zone required to move said movable closure means to the second position is greater than the pressure in the second zone for enabling movement of said movable closure means to the first position by said means for urging.

17. The pulsation dampener as recited in claim 14, wherein:
said movable closure means includes a ball; and
said valve means having an annular seat for sealingly engaging with said ball when in the first position for closing communication and movable from sealing engagement when in the first position for enabling communication between the second zone and said third zone.

* * * * *